(12) United States Patent
Chen

(10) Patent No.: US 12,693,745 B2
(45) Date of Patent: Jul. 28, 2026

(54) INPUT SYSTEMS WITH ADJUSTABLE INPUT THRESHOLDS

(71) Applicant: Apple Inc., Cupertino, CA (US)

(72) Inventor: Denis G Chen, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 19/270,407

(22) Filed: Jul. 15, 2025

(65) Prior Publication Data

US 2026/0086655 A1     Mar. 26, 2026

Related U.S. Application Data

(60) Provisional application No. 63/699,675, filed on Sep. 26, 2024.

(51) Int. Cl.
*G06F 3/02* (2006.01)
*G06F 3/038* (2013.01)

(52) U.S. Cl.
CPC ........... *G06F 3/0202* (2013.01); *G06F 3/038* (2013.01); *G06F 2203/04105* (2013.01)

(58) Field of Classification Search
CPC .................. G06F 3/0202; G06F 3/038; G06F 2203/04105
See application file for complete search history.

(56) References Cited

U.S. PATENT DOCUMENTS 9,625,884 B1 * 4/2017 Ousley ................... G16H 20/30
9,671,894 B2 6/2017 Schenkewitz et al.

| | | | |
|---|---|---|---|
| 10,068,728 B2 * | 9/2018 | Huska | H01H 13/85 |
| 10,275,153 B2 | 4/2019 | Temple | |
| 10,496,209 B2 * | 12/2019 | Vummidi Murali | G01L 25/00 |
| 10,719,159 B2 * | 7/2020 | Shepelev | G02F 1/13338 |
| 10,908,815 B2 | 2/2021 | Marsden | |
| 11,573,677 B2 | 2/2023 | Powderly et al. | |
| 11,692,889 B2 | 7/2023 | Peso et al. | |
| 11,720,064 B2 * | 8/2023 | Ely | G01D 5/2412 |
| | | | 345/174 |
| 12,432,292 B2 * | 9/2025 | Barton | H04M 1/0266 |

(Continued)

FOREIGN PATENT DOCUMENTS

| | | |
|---|---|---|
| CN | 202497138 | 10/2012 |
| CN | 111650840 | 12/2021 |

(Continued)

*Primary Examiner* — Patrick F Marinelli
(74) *Attorney, Agent, or Firm* — Brownstein Hyatt Farber Schreck, LLP

(57) ABSTRACT

An electronic device may include an input system that includes an input member accessible on the exterior of the electronic device and configured to receive a user-applied input force, a beam structure configured to deflect as a result of the input force, a strain sensing system, and a switch that may be actuated by movement of the input member. When the switch is actuated, the electronic device may use a signal provided by the strain sensing system to determine an actuation force of the switch and may further use the determined actuation force to determine a threshold associated with a partial press of the button. The electronic device may include a temperature sensor that provides a temperature signal. The electronic device may use the temperature signal to determine an offset to apply to the signal provided by the strain sensing system.

15 Claims, 10 Drawing Sheets

(56) References Cited

U.S. PATENT DOCUMENTS

| | | | | |
|---|---|---|---|---|
| 2011/0227872 | A1* | 9/2011 | Huska | G06F 3/016 |
| | | | | 345/174 |
| 2018/0011550 | A1 | 1/2018 | Mihál et al. | |
| 2023/0094873 | A1* | 3/2023 | Chen | G06F 3/0362 |
| | | | | 345/156 |
| 2023/0377430 | A1* | 11/2023 | Ostdiek | G08B 6/00 |
| 2024/0256003 | A1* | 8/2024 | Barton | H04M 1/0266 |
| 2025/0240360 | A1* | 7/2025 | Barabadi | H05K 7/2039 |
| 2025/0240361 | A1* | 7/2025 | Awad | H04N 23/56 |
| 2025/0240362 | A1* | 7/2025 | Durning | H04M 1/0266 |
| 2025/0240363 | A1* | 7/2025 | Baker | H04M 1/0268 |
| 2025/0240515 | A1* | 7/2025 | Baker | H04N 23/631 |
| 2025/0377734 | A1* | 12/2025 | Cheung | G06F 3/02 |
| 2026/0012523 | A1* | 1/2026 | Barton | H04M 1/0266 |
| 2026/0025448 | A1* | 1/2026 | Fung | H04M 1/026 |

FOREIGN PATENT DOCUMENTS

| | | |
|---|---|---|
| CN | 113178354 | 9/2022 |
| CN | 115525783 | 6/2023 |
| EP | 3291076 | 4/2019 |

* cited by examiner

300

312

313    342    340    319    344    302

354    355

352    346    348    350    358

700

RECEIVE OUTPUT SIGNAL DATA SAMPLES ~702

DETECT ACTUATION OF TACTILE SWITCH ~704

PERFORM LINE FITTING USING
OUTPUT SIGNAL DATA SAMPLES ~706

REMOVE
OUTLIER
DATA SAMPLE
710~

YES

OUTLIER
DATA SAMPLE
PRESENT? ~708

NO

DETERMINE SWITCH ACTUATION FORCE ~712

INPUT SYSTEMS WITH ADJUSTABLE INPUT THRESHOLDS

CROSS-REFERENCE TO RELATED APPLICATIONS

This application claims the benefit under 35 U.S.C. § 119(e) of U.S. Provisional Patent Application No. 63/699,675, filed Sep. 26, 2024, the contents of which are incorporated herein by reference as if fully disclosed herein.

TECHNICAL FIELD

The subject matter of this disclosure relates generally to input systems for electronic devices, and more specifically, to input systems that utilize multi-modal information to adjust input thresholds.

BACKGROUND

Electronic devices may use physically actuated buttons to receive user input. For example, an electronic device may include a button capable of receiving user-applied input force to control one or more functions of the electronic device in different ways. In some instances, the electronic device may require that the user apply a particular input force to the button before the electronic device performs a particular operation. Accordingly, a force-sensing mechanism may be used to measure an amount of force associated with a user input. This force may be used to determine whether the user has provided the input force needed to perform a device operation. An output signal generated by the force-sensing mechanism may vary over time and/or due to a variety of use-case conditions (e.g., temperature changes, material fatigue, etc.), and thus it may be possible that the measurements performed by the force-sensing mechanism do not accurately represent the input force being applied to the button. This may result in the electronic device performing (or not performing) operations in a manner that does not reflect the intent of the user.

SUMMARY

Embodiments described herein are directed to systems and methods for determining an adjustment to the output signal of a strain sensing system, and providing an output signal offset based on a temperature signal. Some embodiments are directed to a method, where the method includes monitoring an operating state of a button that includes an input member, a beam structure configured to be deflected as a result of a force input applied to the input member, a strain sensing system configured to generate an output signal based on deflection of the beam structure, and switch configured to be actuated by movement of the input member. In some instances, the switch is a dome switch and actuation of the switch corresponds to dome switch collapse. With regard to the operating state of the button, the output signal satisfying a threshold indicates a first operating state of the button and actuation of the switch indicates a second operating state of the button. In some embodiments, the first operating state of the button corresponds to a half button-press. The method also includes detecting an instance of actuation of the switch, determining, using the output signal, an actuation force corresponding to the instance of actuation of the switch, and determining an adjustment to the threshold using the determined actuation force.

In some variations, the method includes applying the determined adjustment to the threshold to change the threshold from a first value to a second value. In other variations, the threshold is a first threshold associated with a first contact location of the input member, and the method may include determining that the first contact location of the input member is contacted by a user during actuation of the switch. In these instances, determining the adjustment to the threshold includes determining a first adjustment to the first threshold. In some of these variations, the method includes determining, based on the determined actuation force, a second adjustment to a second threshold associated with a second contact location.

In some embodiments, determining the actuation force of the switch includes generating a set of output samples from the output signal, removing one or more output samples from the set of output samples, to generate a subset of output samples, and determining the actuation force based on the subset of output samples. In further embodiments, removing one or more output samples from the set of output samples includes: performing a linear fit using the set of output samples and removing the one or more output samples based on the linear fit.

In some embodiments, when the button is in the first operating state a first operation of an electronic device is performed and when the button is in the second operating state a second operation of the electronic device, different from the first operation, is performed.

Other embodiments are directed to an input system of an electronic device, including an input member, a beam structure configured to be deflected as a result of an input force applied to the input member, a strain sensing system configured to generate an output signal based on deflection of the beam structure, a switch configured to be actuated by movement of the input member, and processing circuitry. The processing circuitry is configured to: receive the output signal and determine an operating state of the input system, wherein the output signal satisfying a threshold indicates a first operating state of the input system and actuation of the switch indicates a second operating state of the input system. In some instances, the first operating state of the input system corresponds to a half button-press. The processing circuitry is configured to detect an instance of actuation of the switch, determine, using the output signal, an actuation force corresponding to the instance of the actuation of the switch, and determine an adjustment to the threshold using the determined actuation force.

In some variations, the input system further includes a touch sensor associated with the input member and configured to generate a touch signal. In some of these variations, the processing circuitry is configured to receive the touch signal and determine, based on the received touch signal, a user contact with the input member at a first contact location of a set of contact locations. In these instances, determining the actuation force may include determining a first actuation force corresponding to the first contact location. In some instances, determining the actuation force may include determining a second actuation force corresponding to a second contact location of the set of contact locations. For example, the first contact location and the second contact location may be neighboring (e.g., immediately adjacent) contact locations of the set of contact locations.

In some variations, determining the actuation force of the switch includes generating a set of output samples from the output signal, removing one or more output samples from the set of output samples, to generate a subset of output samples, and determining the actuation force based on the subset of output samples. In some instances, removing one or more output samples from the set of output samples includes performing a linear fit using the set of output samples and removing the one or more output samples based on the linear fit.

Still other embodiments are directed to a method that includes receiving an output signal provided by a strain sensing system associated with an input system, where the input system includes: an input member, a beam structure configured to be deflected as a result of a force input applied to the input member, wherein the strain sensing system is configured to generate the output signal based on deflection of the beam structure, and a temperature sensor configured to measure a temperature of the beam structure and provide a temperature signal. In some variations, the temperature signal is provided by a negative temperature coefficient (NTC) sensor. The method includes receiving the temperature signal, analyzing the temperature signal to determine a temperature change of the beam structure, and performing, based on the determined temperature change, an offset correction of the output signal.

In some instances, offset correction is performed by subtracting an adaptation value from the output signal at an adaptation rate. Further, in some instances, the adaptation value is a first adaptation value when the temperature change is within a first range of temperature values and is a second adaptation value when the temperature change is within a second range of temperature values. In other instances, the adaptation rate is a first adaptation rate when the temperature change is within a first range of temperature values and is a second adaptation rate when the temperature change is within a second range of temperature values.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1:
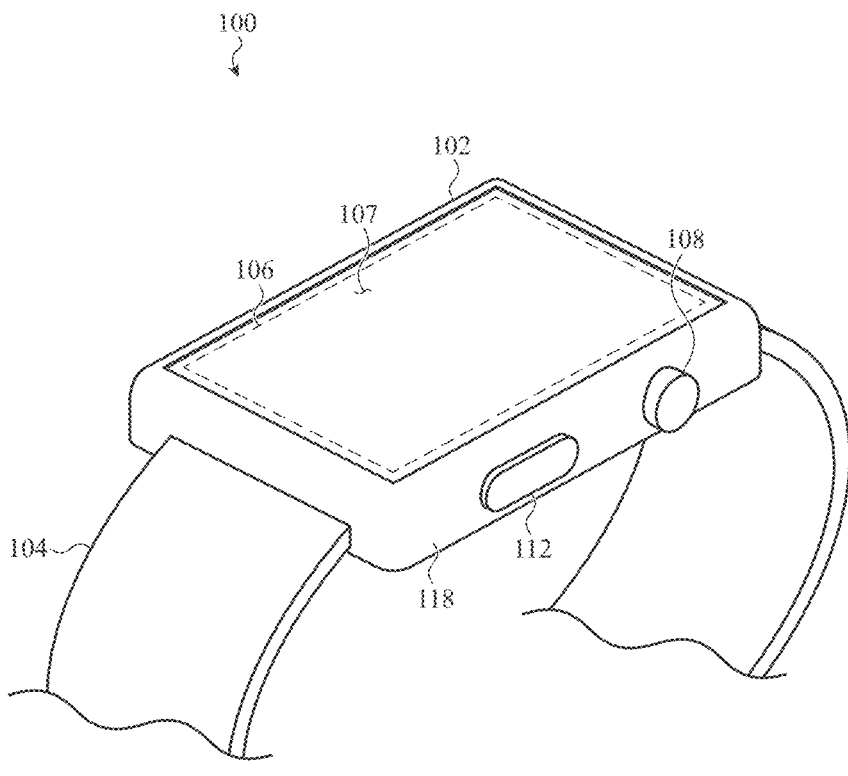
FIG. 1 depicts a perspective view of an example electronic device as described herein.

To easily identify the discussion of any particular element or act, the most significant digit or digits in a reference number refer to the figure number in which that element is first introduced.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Described herein are input systems that utilize adjustable input thresholds to determine a particular type of user input. Specifically, the input systems may utilize multi-modal information (e.g., information acquired by multiple components) in order to adjust a particular input threshold. For example, an input system as described herein may utilize information from multiple force-sensitive components (e.g., a tactile switch and a strain sensing system) to adjust an input threshold. Additionally or alternatively, temperature information from a temperature sensor may be used to apply corrections to an output signal that is used to determine whether the input threshold has been satisfied.

Electronic devices may use physically actuated buttons to receive user input. For example, an electronic device may include an input system that includes a number of components that detect a user input applied to the input system. The input system may include an input member that transmits user-applied force to a tactile switch of the input system. In some cases, the tactile switch may be a type of dome switch, wherein the user must apply enough input force to overcome an actuation force of the switch in order to "actuate" the switch. As used herein, switch actuation refers a change of state of the switch, such as when the switch changes from an open state to a closed state, or vice versa. The tactile switch may provide a digital signal indicating the state of the tactile switch (e.g., open or closed), and the electronic device may use this signal to control a function of the electronic device (e.g., to control a function of a software application). The condition in which a user applies sufficient force to cause actuation of the tactile switch is referred to herein as a "full button-press" or a "full press."

The input system may also include a flexible component (e.g., a beam structure) that receives a portion of the input force applied to the input member, and a strain sensing system capable of providing an output signal associated with the corresponding strain (e.g., force) experienced by the flexible component. The electronic device may detect a strain that satisfies a condition (e.g., a threshold amount of force), and in response, may control a function of the electronic device (e.g., a different function of the software application). The condition in which the user applies a threshold amount of force, which is less than the force required to actuate the tactile switch, may be referred to herein as a "partial button-press" or a "partial press." To detect that the user has applied the threshold amount of force, an output signal of the strain sensing system may be compared to a threshold (e.g., an input threshold for the partial press), where a partial press is detected if the output signal satisfies the threshold. In some instances, a partial button-press may be a half button-press, in which the partial button-press condition is satisfied when the user applies approximately half of the tactile switch actuation force.

The input system may also include a touch sensor associated with a surface of the input member. The touch sensor may enable the user to provide touch input (e.g., touch locations, touch gestures, or touch plus force gestures) that operate a variety of features and functions of the electronic device. The touch sensor may provide a contact location associated with the user-applied input force, indicating where along a surface of the input member the force was applied.

Over time and/or as a result of a number of use-case conditions, the amount of input force required for the strain sensing system to generate an output signal that satisfies the condition (e.g., for the applied force to be detected as a half button-press) may change. For instance, components of the input system may experience wear or fatigue, or the electronic device may experience a use-case event (such as when the electronic device is dropped), which may affect the strain experienced by the flexible component. As a result, the user may perceive a change in the amount of force required to satisfy the partial-press condition. In some cases, the amount of force required to satisfy the partial-press condition may change significantly, such that the amount of force required to satisfy the half-press condition may be near or may even exceed the actuation force of the tactile switch. In these instances, as a user applies an input force to the input system, the input system may register a full button-press before it registers a partial button-press, and thus the input system may not properly capture a user's intent in interacting with the input system.

Additionally or alternatively, the environmental temperature surrounding the electronic device (or other temperature conditions) may affect the amount of input force required to satisfy the partial-press condition. For example, a change in environmental temperature may cause the flexible member and/or other components of the button to undergo temperature-based changes (e.g., thermal expansion, warping, or the like). These effects may cause the output signal generated by the strain sensing system to drift during periods of temperature change, which may cause errors in detecting a partial-press condition.

The present disclosure describes systems and methods for adjusting a partial-press threshold based on tactile switch actuation and the output signal from the strain sensing system. The output signal may be analyzed to determine the actuation force of the tactile switch, and an adjustment to the partial-press threshold may be determined based on the determined actuation force. In some cases, the electronic device may associate the determined tactile switch actuation force and partial-press threshold adjustment with a touch location (e.g., a contact location) of the input member. The electronic device may determine the switch actuation force and partial-press threshold for each contact location of a set of contact locations of the input member. Thus, the user may perceive minimal variations in the amount of applied input force required to perform a partial button-press at different contact locations across the surface of the input member.

The present disclosure also describes systems and methods for performing an offset correction on the output signal that may be caused by temperature changes. The electronic device may include a temperature sensor that provides temperature measurements of one or more components of the input system, and/or the temperature environment of the input system. The electronic device may perform offset correction based on the temperature measurements.

These and other embodiments are discussed below with reference to FIGS. 1-9. However, those skilled in the art will readily appreciate that the detailed description given herein with respect to these figures is for explanatory purposes only and should not be construed as limiting.

FIG. 1 depicts a perspective view of an example electronic device as described herein. While the device 100 is depicted in FIG. 1 as a smartwatch, the concepts presented herein may apply to any appropriate electronic devices, including mobile phones (e.g., device 200 of FIG. 2A-2B), tablet computers, portable electronic devices, wearable devices (e.g., head-mounted displays, glasses, headphones, earbuds, health or fitness monitor, etc.), laptop computers, tablet computers, handheld gaming devices, computing peripherals (e.g., mice, touchpads, keyboards), or any other device. Accordingly, any reference to an "electronic device" encompasses any and all of the foregoing.

The device 100 includes a housing 102 and a band 104 coupled thereto. The housing 102 may at least partially define an internal volume in which components of the device 100 may be positioned. The housing 102 may also define one or more exterior surfaces of the device 100, such as all or a portion of one or more side surfaces, a rear surface, a front surface, and the like. The housing 102 may be formed of any suitable material, such as metal (e.g., aluminum, steel, titanium, or the like), ceramic, polymer, glass, or the like. The band 104 may attach the device 100 to a user, such as to the user's arm or wrist.

The housing 102 at least partially surrounds a display 106. The housing 102 may include or support a cover 107, which may be positioned over the display 106 and may provide a window through which the display 106 (including images displayed thereon) may be viewed by a user. In some embodiments, the display 106 may be attached or coupled to (or abut) the housing 102 and/or the front cover 107.

The cover 107 may be a sheet or sheet-like structure formed from or including a transparent or optically transmissive material. In some cases, the cover 107 is formed from or includes a glass material and may therefore be referred to as a glass cover member. Other example materials for the cover 107 include, without limitation, sapphire, ceramic, glass-ceramic, crystallizable glass materials, or plastic (e.g., polycarbonate). The cover 107 may be formed as a monolithic or unitary sheet. The cover 107 may also be formed as a composite of multiple layers of different materials, coatings, and other elements.

The display 106 may be at least partially positioned within the interior volume of the housing 102. The display 106 may include a liquid-crystal display (LCD), a light-emitting diode (LED) display, an organic light-emitting diode (OLED) display, an active layer organic light-emitting diode (AMOLED) display, an organic electroluminescent (EL) display, an electrophoretic ink display, or the like. The display 106 may be configured to display graphical outputs, such as graphical user interfaces, that the user may view and interact with. Graphical outputs may be displayed in a graphically active region of the display 106 (e.g., an active display region). The display 106 may also define a primary display region, which may generally correspond to the main front-facing, contiguous display region, in which graphical user interfaces, images, videos, applications, and other graphical outputs may be displayed.

In some embodiments, the display 106, the cover 107, or a stack including the display 106 and/or cover 107 may include or be associated with one or more touch- and/or force-sensing systems. In some cases, components of the touch- and/or force-sensing systems are integrated with the display stack. For example, touch-sensing components such as electrode layers of a touch and/or force sensor may be provided in a stack that includes display components (and is optionally attached to or at least viewable through the cover 107). The touch- and/or force-sensing systems may use any suitable type of sensing technology and touch-sensing components, including capacitive sensors, resistive sensors, surface acoustic wave sensors, piezoelectric sensors, strain gauges, or the like. The front exterior surface of the cover 107 may define an input surface (e.g., a touch- and/or force-sensitive input surface) of the device, which may receive inputs from the user. While both touch- and force-sensing systems may be included, in some cases the device 100 includes a touch-sensing system and does not include a force-sensing system. A display that includes touch-sensing functionality may be referred to as a touchscreen or a touchscreen display.

The device 100 may also include one or more input mechanisms, such as button 112, crown (or knob) 108, and/or other physical input systems. In some instances, the input mechanisms may be positioned on a sidewall of the device 100, such as depicted in FIG. 1, where the crown 108 and button 113 extend through sidewall 118 of the housing 102 (e.g., through an aperture in the sidewall 118). These input mechanisms may be coupled to additional mechanical and/or electronic components on the interior of the device 100, as described herein.

The crown 108 may facilitate a variety of potential interactions. For example, the crown 108 may be rotated by a user (e.g., the crown may receive rotational inputs). Rotational inputs of the crown 108 may zoom, scroll, rotate, or otherwise manipulate a user interface or other object displayed on the display 106 among other possible functions. The crown 108 may also be translated or pressed (e.g., axially) by the user. Translational or axial inputs may select highlighted objects or icons, cause a user interface to return to a previous menu or display, or activate or deactivate functions among other possible functions.

The device 100 may also include a button 112, which may be a movable button capable of being depressed toward the interior of the device 100 when the user applies force to the button 112. The button 112 may control various aspects of the device 100. For example, the button may be used to select icons, items, or other objects displayed on the display 106, to activate or deactivate functions (e.g., to silence an alarm or alert), or the like.

As described herein, any of the input mechanisms of the device 100 (e.g., the button 112 and/or crown 108) may be configured as an input system as described herein. Using the button 112 as an example, the button 112 may include both a switch element (e.g., a tactile switch), and a strain-sensing system that detect inputs to the button 112 based on a detected strain (which corresponds to a force). The amount of strain (or force) may be evaluated by the device 100 to determine, for example, whether a user has made a partial press of the button 112, a full press of the button 112, a double tap of the button 112, etc. In some embodiments, the button 112 may additionally, or alternatively, be associated with a touch sensor. The touch sensor may determine a location or change in location of a user's touch on the button 112 (e.g., a contact location). In some embodiments, the touch sensor may be enabled (or its output may be evaluated) subsequent to a user making a partial press of the button 112. The partial press may cause the device 100 to enter a special mode in which the touch sensor associated with the button 112 (e.g., a touch sensor capable of detecting touch input on an exterior surface of the button 112) is enabled.

The input mechanisms (e.g., the button 112 and/or crown 108) may also be associated with haptic actuation systems that produce a tactile or haptic output in response to a detection of a strain (e.g., force) that satisfies a condition (e.g., a threshold). Thus, for example, upon detecting a strain that satisfies a condition (and/or an electrical parameter that is indicative of a strain satisfying the condition), a haptic actuation system may impart a force on an input mechanism (or to the device more generally) to produce a tactile output (e.g., resembling a "click"). This tactile or haptic output may provide tactile feedback to the user to indicate that the input has been recognized by the device. Also, as described herein, the switch elements may be used to detect inputs that exceed a particular force (e.g., an actuation force), and to provide a tactile output in response to that force.

Figure 2A:
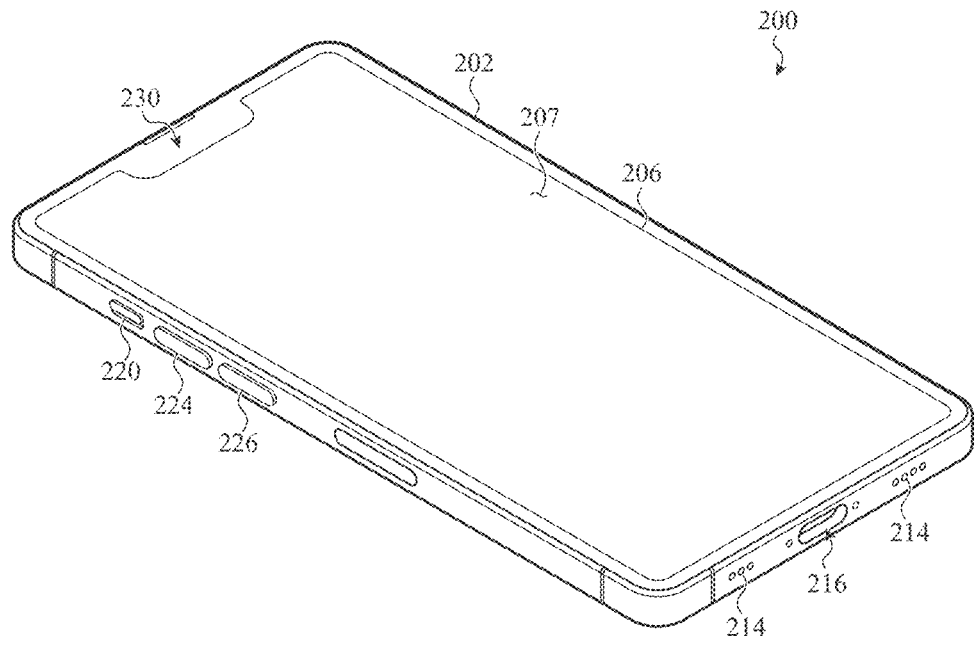
FIG. 2A depicts a front perspective view of another example electronic device.
Figure 2B:
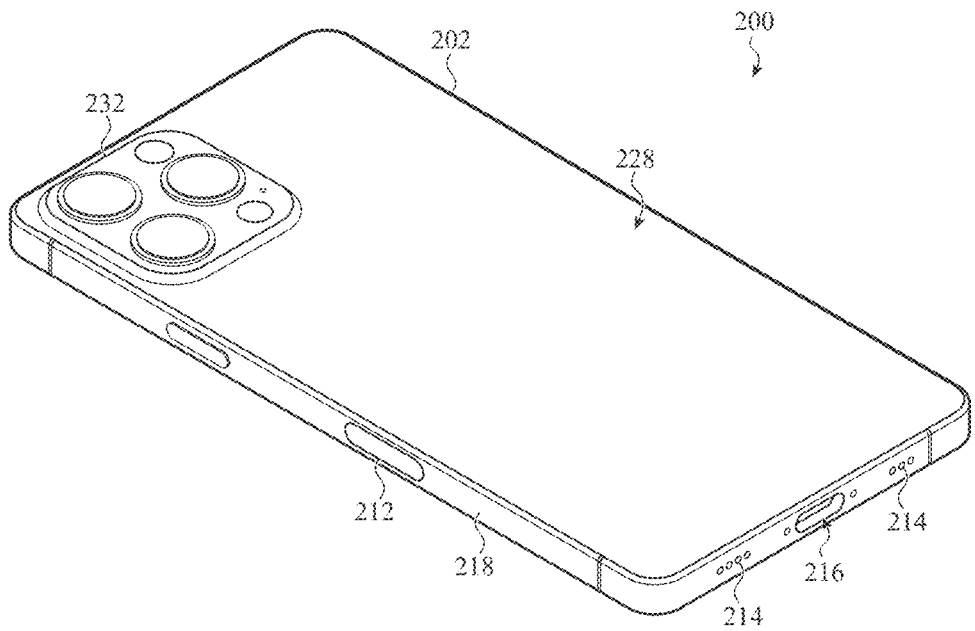
FIG. 2B depicts a rear perspective view of the example device of FIG. 2A.

FIG. 2A depicts a front perspective and FIG. 2B depicts a rear perspective view of another example electronic device 200, which in the example depicted is a mobile phone. Similar to device 100 of FIG. 1, the device 200 includes a housing 202 that may at least partially define an internal volume in which components of the device 100 may be positioned. The housing 202 may also define one or more exterior surfaces of the device 200, such as all or a portion of one or more side surfaces, a rear surface, a front surface, and the like. The housing 102 may be formed of any suitable material, such as metal (e.g., aluminum, steel, titanium, or the like), ceramic, polymer, glass, or the like.

The housing 202 at least partially surrounds a display 206. The housing 202 may include or support a cover 207, which may be positioned over the display 206 and may provide a window through which the display 206 (including images displayed thereon) may be viewed by a user. Similar to cover 107 of FIG. 1, cover 207 may be formed of any of a wide variety of transparent or optically transmissive materials (e.g., glass, sapphire, etc.), through which a user may view the display 206. The display 206 may be any of an LCD, LED, OLED, or the like, as described with reference to display 106. Similarly, the display 206 may include or be associated with one or more touch- and/or force-sensing systems, as described herein.

The device 200 may include a front-facing sensor array 230, which may include one or more cameras, lighting components, and/or other components. For example, the front-facing sensor array 230 may include a flash or other type of lighting component for providing illumination of a scene during image capture by one or more of the cameras. The components may be positioned beneath a portion of the cover 207 or another component of the device 200.

The device 200 may include a rear-facing sensor array 232, which may be in a sensor array region that is defined by a protrusion along the rear of the device 200. The protrusion may define a portion of the rear exterior surface 228 of the device 200 and may at least partially define a raised sensor array region of the rear-facing sensor array 232. The rear-facing sensor array 232 may include one or more cameras, one or more lighting components, and/or or other types of components that provide or support image and/or other types of sensing functions.

One or more of the cameras associated with sensor arrays 230, 232 may be capable of capturing video images, still images, and/or combinations of video and still images, which may collectively be referred to herein as an "image" or "images." The device 200 may receive user input for controlling a range of functions and features of sensor arrays 230, 232. For example, the user may provide input to the device 200 for initiating image capture, controlling camera zoom functions (e.g., zooming in or out of a scene), adjusting camera aperture and/or other camera settings, controlling scene illumination (e.g., by one or more LEDs associated with sensor arrays 230, 232), and/or for controlling other functions and features. User input may be provided by interaction with the touch- and or force-sensitive display 206 and/or one or more of the buttons 212, 224, 226, as described herein.

In addition to the buttons 212, 224, 226, the device 200 may include switches (such as switch 220) and/or other physical input systems. Such input systems may be used to control power and/or sleep/wake states (e.g., the button 212), change speaker volume (e.g., the buttons 224, 226), switch between "ring" and "silent" modes (e.g., the switch 220), and the like. In some cases, the functionality of one or more buttons may be user-selectable, such that the user can select the action(s) that the device performs in response to input force applied to the button. Also, the particular function of one or more of the buttons may depend at least in part on a mode or state of the device. For example, pressing a button may have a different effect when the device is displaying a primary graphical user interface (e.g., a home screen) than when the device is displaying an application graphical user interface (e.g., an image capture user interface associated with operation of a device camera).

The device 200 may also include audio openings 214. The audio openings 214 may allow sound output from an internal speaker system to exit the housing 202. The device 200 may also include one or more microphones. In some cases, a microphone within the housing 202 may be acoustically coupled to the surrounding environment through an audio opening 214.

The device 200 may also include a charging port 216 (e.g., for receiving a connector of a power cable for providing power to the device 200 and charging the battery of the device 200). The charging port 216 may receive a connector of any suitable design. In some cases, the charging port 216 receives a connector corresponding to a USB connector type, such as a USB-C connector. The charging port 216 may also be configured to send and/or receive data via a cable, such as with a USB or other communication protocol.

Figure 2C:
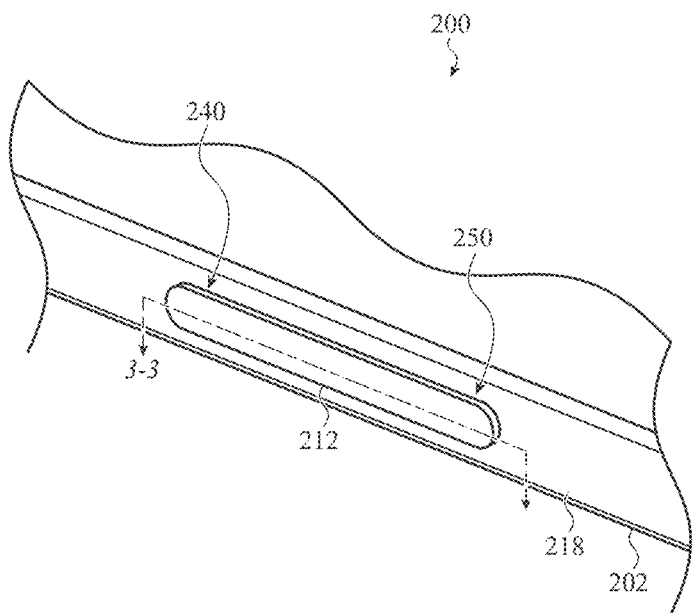
FIG. 2C depicts an enhanced view of an example button of the example electronic device of FIGS. 2A-2B.

FIG. 2C depicts an enhanced view of the example button 212 of device 200, which may be provided along a sidewall 218 of the device housing 202. The button 212 may accept user inputs and cause the device 200 to perform one or more operations in response to the user inputs. The button 212 may include or be integrated with multiple sensing and haptic systems to accept different types of unique inputs and respond differently to the inputs. For example, the button 212 (or the input system more generally) may include or be associated with a strain sensing system and a switch element, which together allow the device to detect inputs having different force thresholds. The button may also include a touch sensor that allows the device to determine where, on the input member, the input was provided (e.g., which region of the button 212 was pushed). As described herein, different types of inputs (e.g., different input forces, different locations) may be associated with different functions of the device 200, such as controlling one or more device applications.

As an example, the button 212 may control image capture functions of the device 200. For example, the device 200 may be configured to capture an image (e.g., using sensor arrays 230, 232) in response to detecting a particular input to the button 212 (e.g., a full press, corresponding to actuation of a tactile switch). The device 200 may capture an image in response to the input (e.g., the full button-press) regardless of the mode of the device, and even when the device is not displaying an image capture user interface. In some cases, the particular input may also cause an image capture user interface to be displayed, while in other cases the device simply captures the image but does not change its mode, active application, active user interface, or the like. In some cases, the device 200 may be configured to launch an image capture user interface in response to detecting a different input at the button 212. For example, a partial press of the button (e.g., corresponding to a force input that is less than the force that results in the dome switch being actuated), may cause the device to launch an image capture interface (and optionally produce a haptic output, as described herein). Accordingly, the single button 212 provides a single physical input system that affords multiple input options to produce different device operations.

As described herein, the button 212 (or the input system more generally) may be configured to determine a location of a force input on the button 212 and may take different actions based on the location of the input. Thus, pressing on a first region 240 of the button 212 (e.g., proximate a first end of the input member) may cause the device to perform a first action, and pressing on a second region 250 of the button 212 (e.g., proximate a second end of the button 212) may cause the device to perform a second action. For example, pressing on the first region 240 may result in a zoom-in operation, while pressing on the second region 250 may result in a zoom-out operation. Other example operations that may be initiated by pressing on the different regions may include setting (e.g., increasing/decreasing) image capture parameters (e.g., exposure, brightness, shutter speed, aperture, sharpness, white balance, exposure compensation, sensitivity, film speed equivalent, and the like).

In some cases, the button 212 may be configured to control device functions other than image capture functions. For example, the button 212 may control a volume of the device by allowing a user to press on opposite ends of the button 212. As another example, the button 212 may control a ringer mode of the device or may be configured to launch a different application or user interface (e.g., a gaming user interface, a music user interface, etc.).

Figure 3:
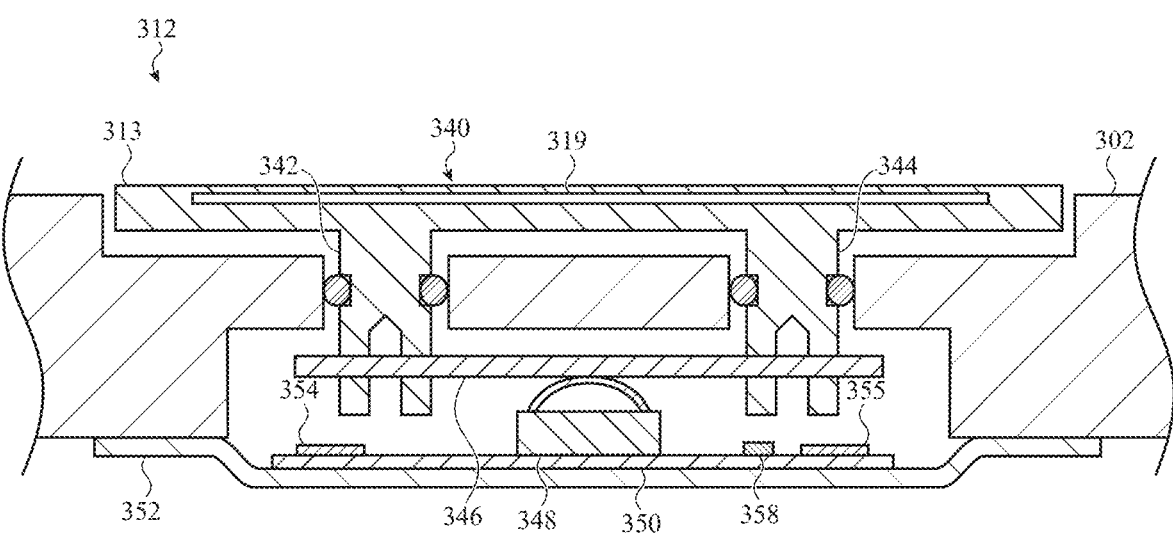
FIG. 3 depicts a partial cross-sectional view of an example button.

FIG. 3 depicts a partial cross-sectional view of an example button 312 that represents an input system as described herein, and that uses a strain sensing system and a switch element (e.g., a tactile dome switch) to detect various types of inputs. The button 312 may be incorporated into a device 300 and may correspond to or be an embodiment of the button 112 in FIG. 1, button 212 in FIGS. 2A-2C, and/or any other input mechanism as described herein. For example, the partial cross-sectional view of FIG. 3 may represent a cross-sectional view taken along line 3-3 of the device 200 depicted in FIG. 2C. The device 300 may correspond to or be an embodiment of device 100 and/or 200. The descriptions of the buttons 112, 212 and the devices 100, 200 will be understood to apply equally to the button 312 and device 300.

The button 312 includes an input member 313, which may define an interface or input surface 340 that a user presses in order to actuate the button 312. The input member 313 may be coupled (e.g., mechanically coupled) to the housing 302, and may be movable with respect to the housing 302. The input member 313 may include posts 342, 344 that extend through the housing 302. The posts 342, 344 may be coupled to a plate 346 that moves with the input member 313 and, more generally, transfers input forces applied to the input member 313 to other components of the button 312. The plate 346 may also define the unactuated position of the input member 313 (e.g., the maximum limit of outward travel of the input member 313), and ultimately retain the input member 313 to the housing 302. In some cases, other structures or configurations are used to couple an input force applied to the input member 313 to internal components and structures (e.g., the structures supporting strain sensing elements).

In other embodiments, the input member 313 may only have a single post or element that extends through the housing 302. The input member 313 may also have more than two posts 342, 344. In alternative embodiments of the input member 313, the components of the input member 313 may have different shapes, or may be positioned in different ways with respect to the housing 302. For example, the input surface 340 may be rectangular, oval, or otherwise-shaped, and may sit proud of, flush, or within the housing 302.

The button 312 may further include a beam structure 352 (e.g., a bracket) that may be at least partially coupled to the housing 302. Although the beam structure 352 is depicted as being symmetrical about the input member 313, it need not be. A printed circuit board (PCB) 350 may be coupled to the beam structure 352. The PCB 350 may be a type of flexible printed circuit or other type of circuit board that allows the PCB 350 to be flexible, such that the PCB 350 may bend and/or flex with the beam structure 352.

At least a portion of the tactile switch 348 may extend between the PCB 350 and a surface of the plate 346. By way of example, the tactile switch 348 is shown mounted to the PCB 350 (e.g., using an adhesive). Alternatively, the tactile switch 348 may be mounted to the plate 346 (or suspended between the PCB 350 and a surface of the plate 346). The tactile switch 348 may be actuated by movement of the plate 346 toward the PCB 350 and beam structure 352. The tactile switch 348 may provide a haptic output to the input member 313 when an amount of force applied to the input surface 340 satisfies an actuation force of the tactile switch 348. The actuation force is an amount of force at which a deformable element of the tactile switch, such as a collapsible dome or buckling spring, switches from a steady state to a semi-steady state. For example, if the tactile switch 348 is a collapsible dome switch, the actuation force would be an amount of force that causes the collapsible dome (e.g., a rubber dome) to collapse. Removal of the actuation force would allow the collapsible dome to pop back to its steady state. In FIG. 3, the tactile switch 348 is depicted with the button 312 in a partial-press condition, in which the dome of the tactile switch 348 is partially depressed, but not collapsed.

The tactile switch 348 may be a type of "normally open" switch, in which the switch remains open until switch actuation. The switch remains closed as long as the input force applied to the input surface 340 exceeds the actuation force. The tactile switch 348 may provide a type of digital signal based on the state of the switch. For example, the tactile switch 348 may be designed to output a signal level corresponding to a "0" when the switch is open (e.g., not actuated), and a signal level corresponding to a "1" when the switch is closed (e.g., actuated). It should be appreciated that in some embodiments, the tactile switch 348 may output signal levels with the opposite correspondence. Alternatively, the tactile switch 348 may be a "normally closed" switch, in which the switch remains closed until switch actuation. Similar to a normally open switch, a normally closed tactile switch 348 may be designed to output digital signal levels corresponding to a "0" or "1," which may indicate whether the switch is open or closed.

In use, input force applied by the user to the input surface 340 of the input member 313 is transmitted to the tactile switch 348 via the plate 346. A portion of the force transmitted to the tactile switch 348 is further transmitted to the PCB 350 and beam structure 352, which experiences a strain as a result. The PCB 350 may include components of a strain sensing system, such as a strain sensor 354, which may provide an output signal corresponding to the strain (e.g., the force) experienced by the PCB 350 and/or beam structure 352. In some embodiments, and as shown, the strain sensor 354 may be printed (such as by ink printing) or otherwise formed on the PCB 350. For instance, strain sensor 354 may be a set of one or more strain gauge sensors printed on the surface of the PCB 350. In other embodiments, the strain sensor 354 may be a set of one or more surface-mounted components, such as a set of one or more surface-mounted strain gauges or other type of strain and/or force sensing components. Alternatively, the strain sensor 354 may be provided in a module that is attached to the PCB 350 (e.g., by solder or other suitable method). Regardless of the sensor type, the number of sensor components, and the method of attachment of the strain sensor 354 to the PCB 350, the strain sensor 354 may be positioned to experience strain as force is applied to the input surface 340.

In some embodiments, the strain sensing system may include a single strain sensor 354 positioned to sense strain at a single location on the PCB 350. In other embodiments, the strain sensing system may include at least a first strain sensor 354 and a second strain sensor 355, with the first and second strain sensors 354, 355 being positioned to sense strain at different locations on the PCB 350. In this manner, the different strain sensors may be used to estimate a force centroid of force applied to the input member 313. The force centroid may be used to compensate for where a force is applied to the input member 313, such as when force is applied to a lateral side of the input member 313. Additionally or alternatively, output signals associated with the strain sensors 354, 355 may be combined (e.g., using processing circuitry) to provide a single output signal that corresponds to the force applied to the input member 313. The combined output signal may provide improved sensitivity to the applied force, which may improve detection of a partial-press condition.

The strain sensors 354, 355 may provide output signals in the form of analog or digital signals. In cases where the strain sensors 354, 355 provide a type of analog output signal, the analog output signal may be converted to a type of digital signal, such as by an analog-to-digital converter (ADC) associated with processing circuitry of the device 300. In other instances, the strain sensors 354, 355 may provide output signals in the form of digital samples.

In some embodiments, the PCB 350 may include a temperature sensor 358, which provides temperature measurements (e.g., a temperature signal) associated with the temperature of components of the button 312 (e.g., tactile switch 348, PCB 350, beam structure 352, etc.). In some variations, the temperature sensor 358 may be a type of thermistor, such as a set of one or more negative temperature coefficient (NTC) thermistors. In other variations, the temperature sensor 358 may be any of a wide variety of temperature sensor types, such as one or more thermocouples/thermopiles, resistance temperature detectors (RTDs), semiconductor-based sensors, digital temperature sensing modules, and/or other types of temperature sensors. In some instances, the temperature sensor 358 and/or PCB 350 may include active or passive circuitry associated with providing the temperature signal (e.g., one or more filters, amplifiers, etc.). In some variations, the button 312 may include a set of two or more temperature sensors, which may be arranged in different locations to measure the temperature of components that affect operation of the button 312.

The temperature sensor 358 may provide a temperature signal in the form of an analog or digital signal. In cases where the temperature sensor 358 provides a type of analog temperature signal, the analog temperature signal may be converted to a type of digital signal, such as by an ADC associated with processing circuitry of the device 300. In other instances, the temperature sensor 358 may provide the temperature signal in the form of digital samples.

The example configuration of the tactile switch 348, PCB 350, beam structure 352, strains sensor 354, 355, and temperature sensor 358 depicted in FIG. 3 is one of many possible configurations. For example, one or more strain sensors 354, 355 and/or temperature sensor 358 may alternatively be attached directly or indirectly to the beam structure 352 and electrically connected to the PCB 350 (or other circuit board) via flexible pigtail, wiring, or other connection method. Similarly, while PCB 350 is depicted as being coupled to a top surface of the beam structure 352 (e.g., a surface facing the input member 313), in some embodiments, the PCB 350 may coupled to a bottom surface of the beam structure 352 (e.g., on an opposite surface of the beam structure 352 from the input member 313).

The input member 313 may also include other components, such as a touch sensor 319 and/or one or more other sensors. In some embodiments, the touch sensor 319 may be formed on a flexible printed circuit (not depicted) having a pigtail that extends through one of the posts 342, 344 (such as through a hollow shaft in one of the posts 324, 344). The pigtail may provide signal and/or power/ground connection between the touch sensor 319 and a control circuit and ground connection provided on the interior of the device 300. In the example depicted, the touch sensor 319 is formed as a single sensing component. In some variations, the touch sensor 319 may be formed as a set of two or more sensing components that each generate a touch signal corresponding to the location on the input surface 340 contacted by the user.

When a user contacts the input member 313, a portion of the user's skin (e.g., a portion of a fingertip) may overlap with a corresponding portion of the input member 313. The input system may, for the purpose of performing the various techniques described herein, represent this contact as a single location (a "contact location") at which force is applied to the input member 313. Accordingly the touch signal generated by the touch sensor 319 may be used to determine a contact location associated with a given contact between the input member 313 and the user.

Figure 4:
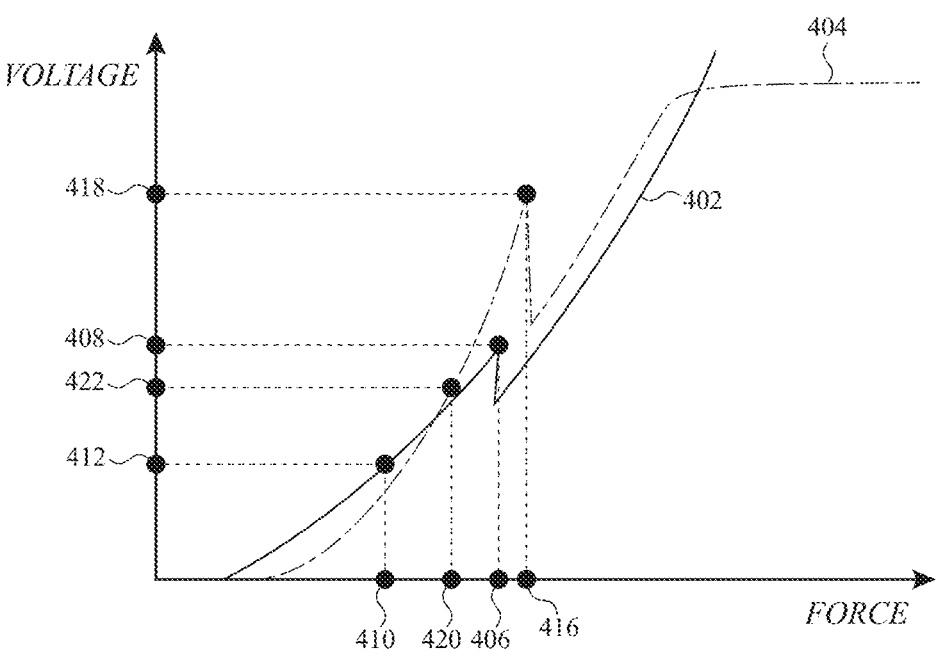
FIG. 4 depicts a graph that includes example output signals from a strain sensing system as force is applied to a button.

FIG. 4 depicts a graph 400 that includes example output signals 402, 404 from a strain sensing system as force is applied to a button under different conditions. In this example, the output signals 402, 404 are provided from the strain sensing system (e.g., from strain sensor 354) in the form of a voltage signal, which is represented on the vertical axis of the graph 400. An input force applied to the button (e.g., to the input surface 340) is represented on the horizontal axis.

A first output signal 402 (e.g., depicted as a solid line) may represent the output signal generated by the strain sensing system in an instance when the user applies an input force at a first contact location of the input surface of an input member (e.g., the center of the input surface 340). Conversely, a second output signal 404 (e.g., depicted as a dashed line) may represent the output signal generated by the strain sensing system in an instance when the user apples an input force at a second contact location of the input surface (e.g., a contact surface near one of the ends of an input surface, such as region 240 or region 250 of button 212). As increasing force is applied to the input member, the applied force may overcome the actuation force of the tactile switch. However, when force is applied at the first contact location, such as for the first output signal 402, the force may be more directly transmitted to the tactile switch than when force is applied at the second contact location, such as for the second output signal 404. As a result, the tactile switch may actuate with less applied force (e.g., actuation force 406) when the force is applied at the first location, than may be required when the force is applied at the second location (e.g., actuation force 416).

As described herein, in embodiments where the tactile switch is a type of collapsible dome switch, the dome collapses when the user applies sufficient force to the input member to overcome the actuation force. Collapse of the dome may result in a temporary reduction in strain on some components of the button (e.g., on the PCB 350 and beam structure 352). Consequently, the signal level of an output signal generated by the strain sensing system (e.g., the first output signal 402 or the second output signal 404) may temporarily decrease during actuation, and then continue to increase as a user applies increasing force. This drop in output signal level corresponding to actuation of the tactile switch is herein referred to as an "actuation artifact" in which the output signal does not currently represent the force being applied to the button.

In some variations, the input system may be configured such that the input member has a limited range of travel relative to the housing of the electronic device. In these instances, when the input member has reached this limit, the strain sensing system may have limited ability to measure further increases to the input force applied to the input member. For example, the second output signal 404 is shown in FIG. 4 as plateauing, which may represent the input member reaching the end of its range of travel.

As discussed in more detail herein, an input system may determine a partial button-press when the output signal generated by the strain-sensing system satisfies a threshold. Because the generated output signal may depend, in some instances, on both the input force applied by the user and the contact location at which the input force is applied, it may be desirable to set a value of the threshold based on the contact location. For example, for a given instance of a user contact with the input member, the input system may select a threshold from a plurality of thresholds, each of which corresponds to a different contact location, to detect a particular partial press. Accordingly, when the input system determines that a user is applying an input force at the first contact location (e.g., corresponding to the first output signal 402), the input system may select a first threshold with a value that corresponds to a first signal level 412. Conversely, when the input system determines that a user is applying an input force at the second contact location (e.g., corresponding to the second output signal 404), the input system may select a second threshold with a value that corresponds to a second signal level 422. In this way, the threshold used to detect a partial press may be varied as the force required to actuate the tactile switch changes with contact location.

In some variations, the threshold(s) used to detect a partial press may be adjusted over time. For example, in some variations, the input systems may determine an actuation force of the tactile switch over time and may adjust one or more partial-press thresholds using the determined actuation force. Specifically, the output signal of a strain sensing system as described herein may be used to determine an actuation force associated with an instance of actuation of the tactile switch. This determined actuation force may be used, alone or in combination with other actuation forces determined for other instances of actuation of the tactile switch, to determine an adjustment to one or more partial-press thresholds.

Figure 5A:
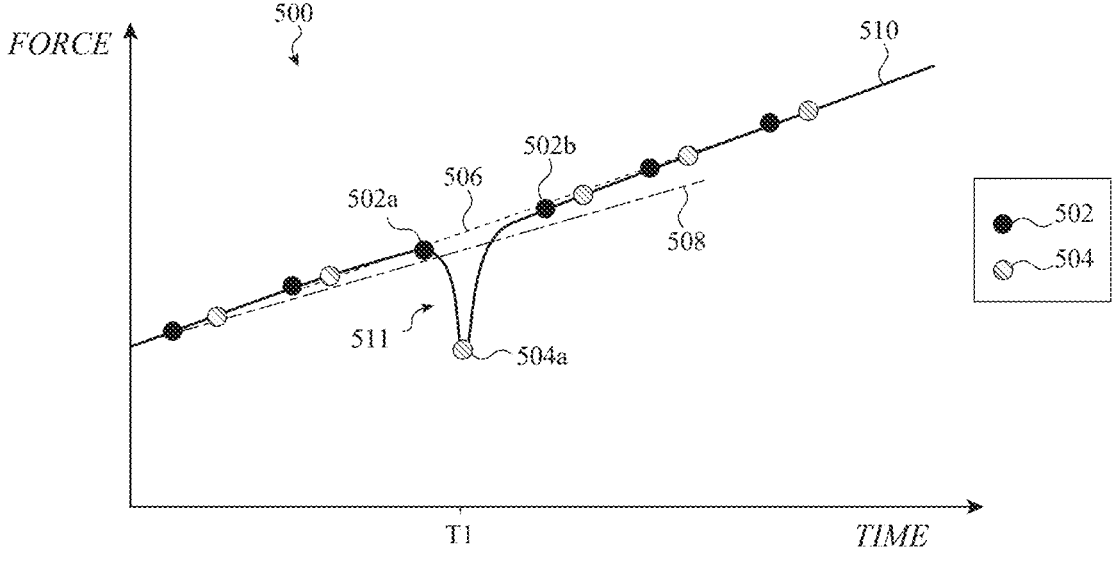
FIG. 5A depicts example sets of output samples associated with actuation of a tactile switch.
Figure 5B:
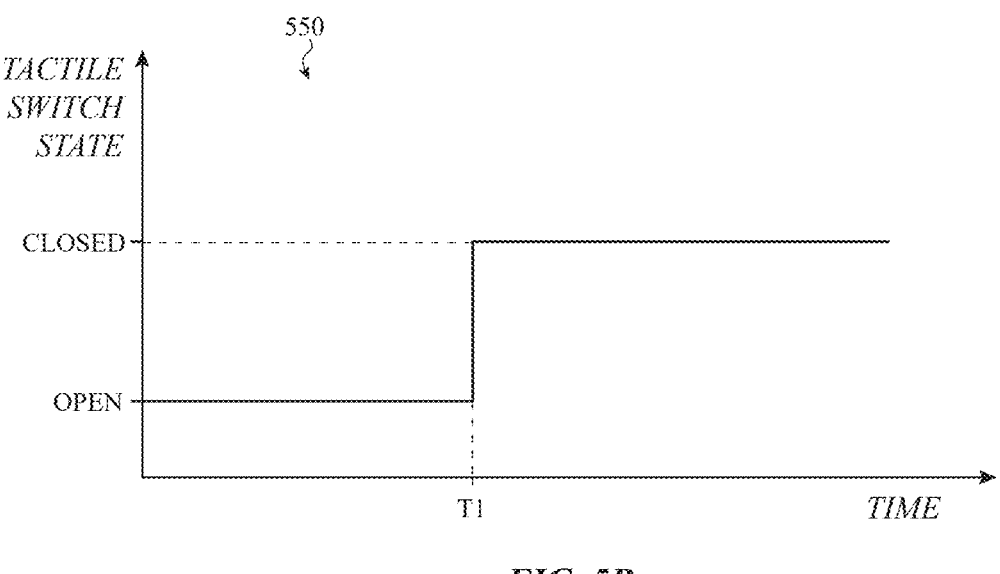
FIG. 5B depicts a state diagram of a tactile switch.

FIG. 5A depicts example sets of output samples 502, 504 that may be generated from an instance of actuation of a tactile switch as described herein, and that may be used to determine an actuation force of the tactile switch. Specifically, the sets of output samples 502, 504 include a first set of output samples 502 and a second set of output samples 504, each of which are collected with a different relative timing toward an instance of actuation of the tactile switch. These sets of output samples 502, 504 are provided to illustrate the potential impact on the timing of the output samples relative to the actuation of the tactile switch, and it should be appreciated that in practice only one of these sets of output samples 502, 504 may be generated for a given instance of actuation of the tactile switch. FIG. 5B depicts a corresponding state diagram 550 of the tactile switch during this instance. In the example depicted, the tactile switch is a type of normally open switch, that transitions to a closed state when actuated at T1. The sets of output samples 502, 504 may be generated from the output signal of strain sensing system (e.g., strain sensor 354), and each output sample represents a force as measured by the strain sensing system at a moment in time. For example, sets of output samples 502, 504 may represent digital values (e.g., generated by an ADC) generated from an analog output signal 510. As shown in FIGS. 5A and 5B, the actuation of the tactile switch occurs at time T1, and the analog output signal 510 includes an actuation artifact 511 corresponding to the actuation of the tactile switch.

In some variations, to determine the actuation force associated with a particular instance of switch actuation, a predetermined number of output samples may be selected that correspond to the switch actuation. For example, processing circuitry associated with the input system may store output samples generated by the strain sensing system (e.g., in a buffer). Upon detecting actuation of the tactile switch (e.g., when the state of the tactile switch changes), the processing circuitry may collect a set of output samples. For example, the set of output samples may include a first number N of output samples that succeed the actuation of the tactile switch and a second number M of output samples that precede the actuation of the tactile switch. Accordingly, the set of output samples that is used to determine actuation force may be samples that are acquired both before and after switch actuation.

To determine the actuation force associated with tactile switch actuation, processing circuitry associated with the electronic device may process the selected set of output samples. The processing circuitry may apply any of a wide variety of suitable techniques to determine the actuation force. For example, as part of determining actuation force, the processing circuitry may perform a linear regression in order to determine a best fit line for the selected set of output samples. In some instances, a value of the best fit line that corresponds to the switch actuation (e.g., at time T1) is selected as the determined actuation force for that instance of the switch actuation.

Depending on the sampling rate used to generate a set of output samples, as well as the relative timing of the actuation of the tactile switch, one or more output samples may be associated with the actuation artifact 511. For example, a first set of output samples 502 may be timed relative to the switch actuation such that drop in force associated with the actuation artifact 511 is not measured by the first set of output samples 502. For example, the first set of output samples 502 may include two successive output samples 502*a*-502*b*, where a first output sample 502*a* is generated before the actuation artifact 511 and a second output sample 502*b* is generated after the actuation artifact 511. Conversely, a second set of output samples 504 may be timed relative to the switch actuation such that one or more output samples correspond to the actuation artifact 511. For example, the second set of output samples 504 includes an output sample 504*a* that is generated during the drop in force associated with the actuation artifact 511. Accordingly, the output sample 504*a* may not accurately represent the input force that is currently being applied by the user. Accordingly, when the second set of output samples 504 is used to determine an actuation force for the tactile switch, the presence of the output sample 504*a* may negatively impact the accuracy of this determination.

Accordingly, in some instances it may be desirable to remove one or more output samples from the set of output samples before determining that actuation force. For example, in some variations, the processing circuitry may a determine fit line based on the set of output samples and may determine whether any of the set of output samples exceed a predetermined tolerance around the fit line. For example, the first set of output samples 502 may be fit to a first fit line 506. In this instance, the processing circuitry may determine that none of the first set of output samples 502 deviate from the fit line by more than the predetermined tolerance, and the processing circuitry may use the first fit line 506 to determine the actuation force, as described herein.

Conversely, the second set of output samples 504 may be fit to a second fit line 508. By virtue of the inclusion of the sample 504*a* in the second set of output samples 504. The processing circuitry may determine that the first output sample 504*a* deviates from the second fit line 508 by more than the predetermined tolerance and may remove the sample 504*a* from the second set of output samples 504 to generate a subset of the second set of output samples 504. The processing circuitry may subsequently determine an updated fit line using the subset of the second set of output samples 504 (e.g., the samples remaining after the removal of output sample 504*a*), which may be closer to the first fit line 506. In some instances, this updated fit line may be used to determine the actuation force. In some instances, this process may be repeated (e.g., removing output samples and updating the fit line) until the remaining samples are all within the predetermined tolerance.

While a best fit line may be used to remove output samples from a set of output sample (e.g., to remove the sample 504a from the second set of output samples 504), in some instances other analysis techniques may be used to determine the actuation force from a set of force values. For example, the processing circuitry may determine an average of the values of a set of output samples (or a subset of output samples after one or more output samples have been removed) to determine the actuation force. Similarly, the processing circuitry may select one or more output samples that were collected before the switch actuation and one or more output samples that were collected after the switch actuation and may average these output samples to determine the actuation force.

Accordingly, the processing circuitry may determine different actuation forces for different instances of actuation of a tactile switch. The processing circuitry may be configured to store an "operating force" that represents an input force (as measured by the strain sensing system) at which the tactile switch is expected to actuate. As the processing circuitry determines actuation forces associated within individual instances of actuation of the tactile switch, the processing circuitry may update the stored operating force (e.g., may replace a current value of the operating force with a new value of the operating force).

For example, in some variations the processing circuitry may use the actuation force determined for the most recent switch actuation as the stored operating force. With each new instance of actuation of the tactile switch, the processing circuitry may determine a corresponding actuation force that becomes the new value of the operating force (e.g., replaces the current value of the operating force). In other variations, a new value of the operating force may be determined based on a combination of multiple actuation forces determined for multiple instances of actuation of the tactile switch. For example, with a new switch actuation, a new value of the operating force may be determined by averaging (or performing a weighted average of) a number of the most recent actuation forces determined by the processing circuitry. Similarly, with a new switch actuation, a new value of the operating force may be determined by averaging (or performing a weighted average of) the current value of the operating force and the newly determined actuation force.

In this way, the stored operating force for the tactile switch may be updated over time. The processing circuitry may select an input threshold for a partial press based on the stored operating force (e.g., a half press threshold may be selected as half of the stored operating force), and accordingly the input threshold is adjusted with corresponding adjustments to the stored operating force. In this way, when the processing circuitry determines an actuation force associated with an instance of actuation the tactile switch, the processing circuitry may use this actuation force to adjust one or more partial-press thresholds.

It should be appreciated that in some instances, the processing circuitry may store a plurality of operating forces for the tactile switch, each associated with a different contact location of an input surface of an input member as described herein. In some variations, when the processing circuitry determines that an instance of actuation of the tactile switch is associated with a particular contact location, the processing circuitry will only update the operating force associated with that contact location. In these variations, the processing circuitry will only adjust a partial-press threshold associated with that contact location.

In other variations, when the processing circuitry determines that an instance of actuation of the tactile switch is associated with a particular contact location, the processing circuitry may update the operating forces associated with multiple contact locations. For example, while a given instance of actuation of the switch may be associated with an input force applied to a single contact location, the output signal of the strain sensing system may be used to determine actuation forces associated with other contact locations (e.g., each representing an estimate of the actuation force that would have occurred if the user had instead applied to the input force to a different contact location). For example, the processing circuitry may determine that a user is applying an input force to a first contact location during an instance of actuation of the tactile switch. In this instance, the processing circuitry may determine a first actuation force associated with the first location, and may also determine a second actuation force associated with the second contact location. The first contact location and the second contact location can be neighboring contact locations of the set of contact locations, but need not be.

Accordingly, a single instance of actuation of the switch may be used to update a first operating force associated with the first contact location and to update a second operating force associated with the second contact location. Similarly, the processing circuitry may determine a first adjustment to a first partial-press threshold associated with the first contact location and may determine a second adjustment to a second partial-press threshold associated with the second contact location.

Figure 6:
FIG. 6 depicts an example method for determining an adjustment to a threshold used to detect a partial button-press.
Figure 6:
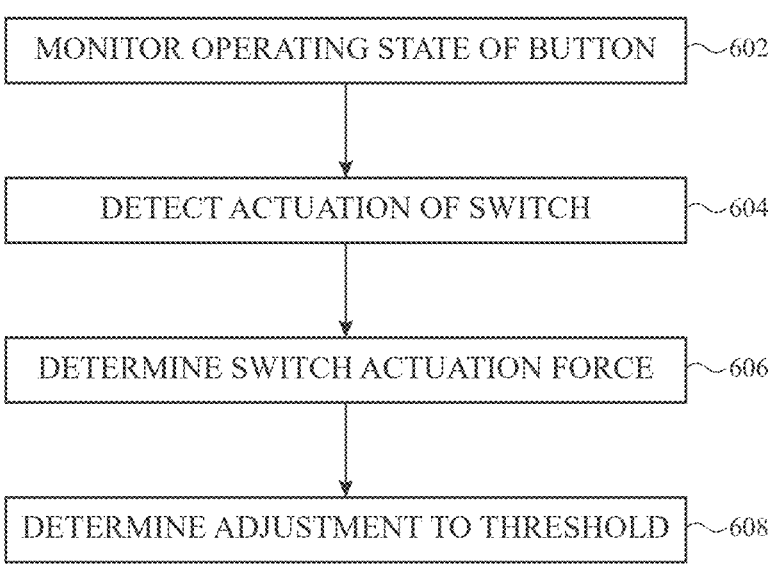

FIG. 6 depicts an example method 600 for determining an adjustment to a threshold used to detect a partial button-press. The method may be performed by an electronic device (e.g., device 100, 200, 300), such as by processing circuitry associated with the electronic device (e.g., processing circuitry 902 of FIG. 9). The partial button-press may be associated with an input system (e.g., button 112, 212, 312), that includes an input member (e.g., input member 313, a beam structure (e.g., beam structure 352) configured to be deflected as a result of a force input applied to the input member, a strain sensing system (e.g., strain sensor 354) configured to generate an output signal based on deflection of the beam structure, and a switch (e.g., a tactile switch 348) configured to be actuated by movement of the input member.

At step 602, the method 600 includes monitoring the operating state of the button, which may include monitoring for an instance of actuation of the tactile switch. As described herein, the tactile switch may provide a signal indicating whether the switch is in an open state or a closed state.

At step 604, the method 600 includes detecting actuation of the tactile switch. Depending on the configuration of the tactile switch, actuation can be detected based on the switch being in the open state or the closed state. In some variations, the electronic device may detect actuation based on the switch changing from the open state to the closed state, or vice versa, depending on the configuration of the tactile switch.

At step 606, the method 600 includes determining, using the output signal, an actuation force corresponding to the instance of the actuation of the tactile switch. The actuation force may be determined in any manner as described in more detail herein, including as described herein with respect to FIG. 7. In some instances, the actuation force may be used to update one or more operating forces associated with the tactile switch, such as described in more detail herein.

In some embodiments, the input member includes a touch sensor that generates a signal indicating a contact location on an input surface of the input member. In these variations, the method 600 may include determining user contact with a first contact location of the input member during actuation of the switch. In these variations, the determined actuation force may be a first actuation force corresponding to the first contact location. In some of these variations, the method 600 may further include determining, using the output signal, a second actuation force corresponding to a second contact location.

At step 608, the method 600 includes determining an adjustment to a partial-press threshold. The adjustment may be applied to a current value of the partial-press threshold to update the threshold from a first value to a second value. The adjustment to the partial-press threshold may be based on a corresponding adjustment to a stored operating force for the tactile switch. As discussed in more detail herein, a partial-press threshold may be set as a predetermined percentage of the stored operating force (e.g., 50% of the operating force for a half press). When the operating force is adjusted based on the measured actuation force, the partial-press threshold may be similarly adjusted to maintain the predetermined percentage.

It should be appreciated that in cases where the input system is configured to identify a contact location associated with the instance of the actuation of the switch, the threshold adjustment may be associated with the determined contact location. For example, the method 600 may include determining user contact with a first contact location of the input member during actuation of the switch. In these variations, the partial-press threshold may be a first partial-press threshold associated with the first contact location, and the determined adjustment may be a first adjustment to the first partial-press threshold. In some of these variations, the method 600 may further include determining a second adjustment to a second partial-press threshold corresponding to a second contact location.

Figure 7:
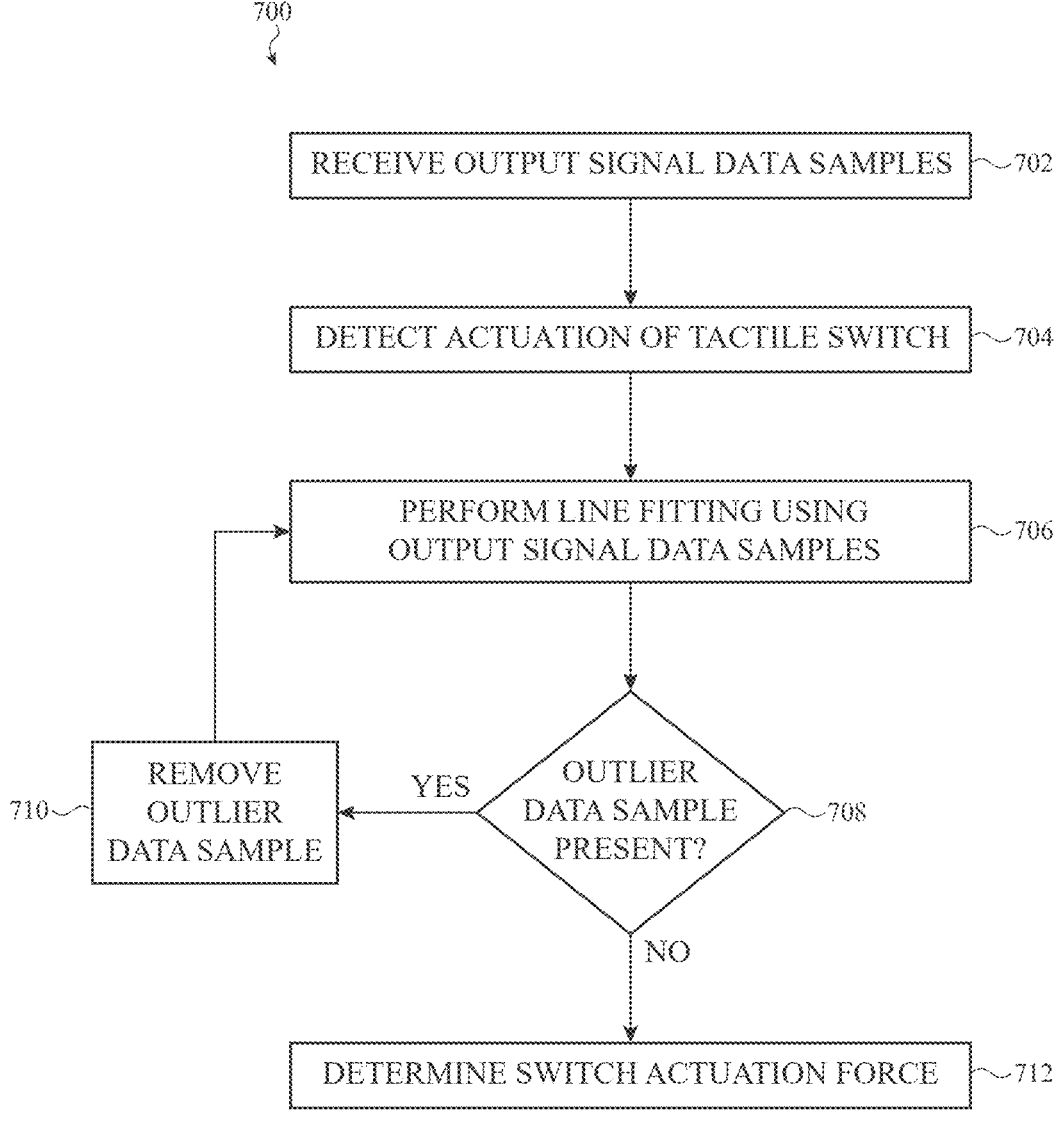
FIG. 7 depicts an example method for determining a switch actuation force.

FIG. 7 depicts an example method 700 for determining a switch actuation force, such as described with reference to step 606 of method 600. Method 700 may be performed by processing circuitry associated with the electronic device, such as described herein.

At step 702, the method includes receiving an output signal from the strain sensing system. The output signal may be received in the form of output samples, such as described herein with respect to FIG. 5A.

At step 704, the method includes detecting an instance of actuation of a tactile switch, such as described with respect to step 604 of method 600. In response to detecting the instance of the actuation of the tactile switch, a set of output samples may be selected. At step 706, the method includes performing line fitting using the selected set of output samples. For instance, the method may include performing a linear regression on the set of output samples to determine a best fit line for the set of output samples.

At step 708, the method includes analyzing the output samples to determine whether any of the output samples exceed a predetermined tolerance around the fit line, and samples found to have exceeded the predetermined tolerance (e.g., outlier samples) may be removed from the set of samples.

Upon determining the presence of one or more outlier samples, at step 710 the method includes removing the outlier samples from the set of samples. Using the remaining samples, step 706 may be repeated, to determine a new best fit line. Upon determining that no outlier samples are present, at step 712 the method includes determining the actuation force for the instance of the action of the tactile switch, such as described for step 606 of method 600.

Figure 8:
FIG. 8 depicts an example method for performing offset correction of an output signal of a strain sensing system using a temperature signal.
Figure 8:
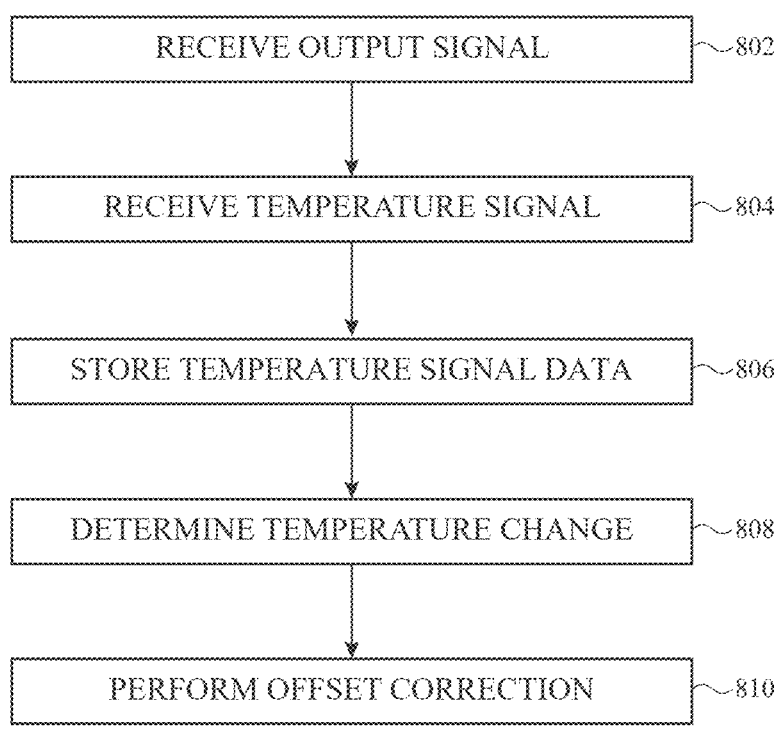

FIG. 8 depicts an example method 800 for performing offset correction of an output signal of a strain sensing system using a temperature signal. The method may be performed by an electronic device (e.g., device 100, 200, 300), such as by processing circuitry associated with the electronic device (e.g., processing circuitry 902 of FIG. 9). The temperature signal may be provided by a temperature sensor (e.g., temperature sensor 358) configured to measure temperature of the beam structure, tactile switch, PCB (e.g., PCB 350), and/or other components of a button.

At step 802, the method includes receiving the output signal from a strain sensing system, such as described herein. At step 804, which may be performed concurrently with step 802, the method includes receiving the temperature signal. In some examples, the temperature signal may be received as a set of one or more digital data samples.

At step 806, the method includes storing temperature signal data, such as one or more of the received temperature data samples. In some embodiments, storing the temperature data samples includes storing timing information associated with each temperature data samples (e.g., time stamps or other forms of timing information).

At step 808, the method includes determining a temperature change. In some embodiments, determining the temperature change may include comparing one or more temperature data samples indicative of a current temperature to one or more previously received and stored data samples indicative of a previous temperature. For example, processing circuitry of the electronic device may continually compare one or more current temperature data samples (or recently received temperature data samples) to one or more temperature data samples acquired a predetermined time interval in the past. For instance, a temperature difference may be determined between one or more current temperature samples and one or more temperature data samples acquired 0.5 s, 1 s, 2 s, 5 s, 10 s, 20 s, or other time interval before the current temperature sample(s).

In some embodiments, the processing circuitry may determine a first average temperature using two or more current (or recently received) temperature samples, and may determine a second average temperature using two or more data samples acquired a time interval in the past. The difference between the first average temperature and second average temperature may represent the temperature change. In other embodiments, the temperature change may be determined using other methods.

At step 810, the method includes performing offset correction of the output signal of the strain sensing system, based on the determined temperature change. In one embodiment, performing the offset correction may include subtracting a fixed, predetermine value (representing an amount of force) from the output signal (e.g., via an adaptation value that is removed from the output signal), at a fixed, predetermined rate (e.g., an adaptation rate). Specifically, the adaptation value that is subtracted from the output signal is selected to move the output signal toward a value of 0. The adaptation value is selected to have a common polarity as the output signal, such that the absolute value of the output signal is reduced as the adaptation value is subtracted from the output signal. For example, when the output signal has a positive value, an adaptation value with a positive value may be subtracted from the output signal. Conversely, when the output signal has a negative value, an adaptation value with a negative value may be subtracted from the output signal (in other words, an adaptation value with a positive value is added to the negative output signal).

In further embodiments, the adaptation value may be a first adaptation value when the temperature change is within a first range of temperature values, and may be a second adaption value when the temperature change is within a second range of temperature values that is higher than the first range of temperature values. For example, the first adaptation value may be 2 gram-force (gF), 2.5 gF, 2.75 gF, 3 gF, or other adaptation value (e.g., with a common polarity as the output signal). The adaptation value may be subtracted from the output signal at an adaptation rate that may be in the range of 0.5 s to 1 s. As one example, the processing circuitry may subtract 2.5 gF from the output signal every 1 s when the temperature change is within the first range of temperature values. The second adaptation value may be 4 gF, 4.5 gF, 5 gF, 5.5 gF, or other value (e.g., with a common polarity as the output signal), and the second adaptation rate may be 0.75 s, 1 s, 1.25 s, 1.5 s, or other value. For instance, the processing circuitry may subtract 5 gF from the output signal every 0.5 s when the temperature change is within the second range of temperature values.

It should be appreciated that the adaptation value subtracted from the output signal may be a larger value and/or may be subtracted more frequently (e.g., at a higher adaptation rate) when the temperature change is determined to be in the (higher) second temperature range, as compared to when the temperature chance is determined to be in the (lower) first temperature range. In some instances, no offset correction may be performed when the temperature change is determined to be in the first temperature range, or less than the first temperature range. In some variations, the adaptation value and/or adaptation rate may be based on a determination that the temperature change is within a one of three or more possible temperature ranges. For instance the adaptation value and/or adaptation rate may be based on whether the temperature change is within a first range of temperature values, a second range of temperature values, a third range of temperature values, or additional ranges of temperature values.

It should also be appreciated that the adaptation value may be subtracted from the output signal in order to correct the output signal toward a baseline of 0 gF. That is, when the output signal indicates 0 gF, or is within a threshold value of 0 gF, the offset correction may be withheld.

Figure 9:
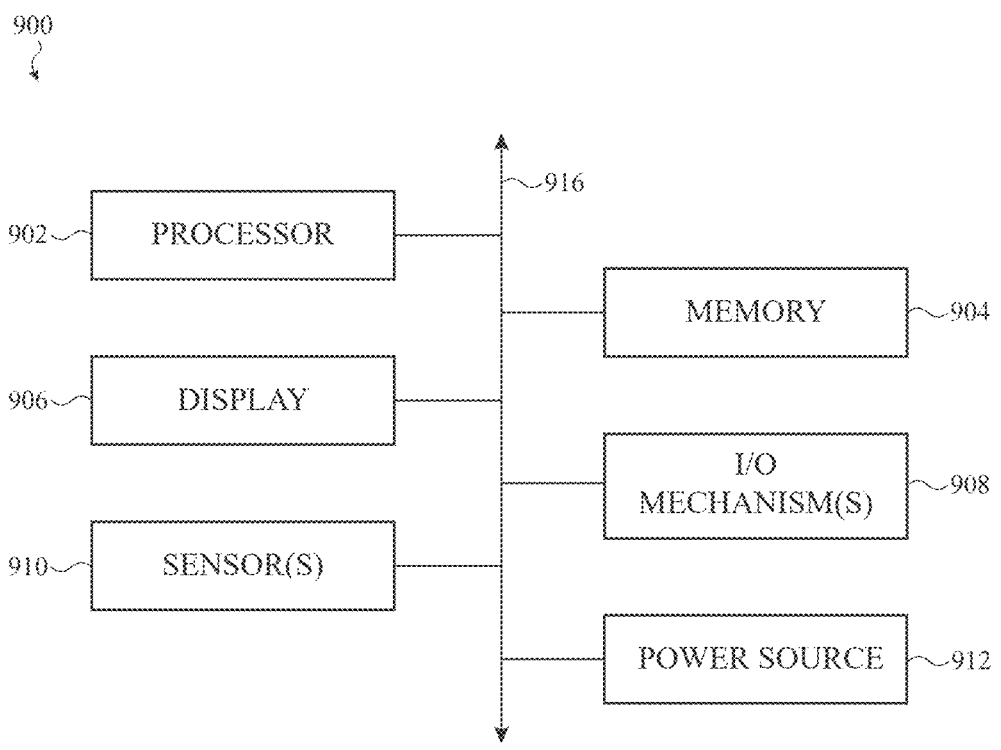
FIG. 9 depicts a block diagram of an example electronic device.

FIG. 9 depicts a block diagram of an example electronic device 900, which may in some cases be the electronic devices described with reference to FIGS. 1, 2A-C, and/or 3 (e.g., devices 100, 200, and/or 300). The electronic device 900 may include a button as described with reference to FIGS. 2A-2C and 3, and a strain-sensing device as described with reference to FIG. 3. The electronic device 900 may optionally include an electronic processor 902, memory 904 or storage device, a display 906 (e.g., a light-emitting display), an input/output (I/O) mechanism 908, a sensor(s) 910, and/or a power source 912.

The processor 902 may control some or all of the operations of the electronic device 900. The processor 902 may communicate, either directly or indirectly, with some or all of the other components of the electronic device 900. For example, a system bus or other communication mechanism 916 can provide communication between the processor 902, memory 904, display 906, I/O mechanisms 908, the sensor(s) 910, and power source 912.

The processor 902 may be implemented as any electronic device capable of processing, receiving, or transmitting data or instructions, whether such data or instructions are in the form of software or firmware or otherwise encoded. The processor 902 may also receive, transmit, or cause other circuits to transmit control signals. As examples, the processor 902 may include a microprocessor, a central processing unit (CPU), a graphics processing unit (GPU), an application-specific integrated circuit (ASIC), a digital signal processor (DSP), a field-programmable gate array (FPGA), a control circuit, or a combination of such devices. As described herein, the term "processor" is meant to encompass a single processor or processing unit, multiple processors or processing units, or other suitably configured computing element or elements. In some cases, the processor 902 may be a distributed processor.

It should be noted that the components of the electronic device 900 can be controlled by multiple processors. For example, select components of the electronic device 900 (e.g., sensor(s) 910) may be controlled by a first processor, and other components of the electronic device 900 (e.g., the display 906) may be controlled by a second processor, where the first and second processors may or may not be in communication with each other.

The processing circuitry used to perform the techniques described herein may include the processor 902, as well as any other circuitry (e.g., one or more ADCs) as may be needed to obtain signals from the various components of the input systems described herein. For example, the processor 902 may be operable coupled to memory 904, and may be configured to execute instructions causing the processor 902 to perform the various operations of the methods described herein.

The power source 912 can be implemented with any device capable of providing energy to the electronic device 900. For example, the power source 912 may include one or more batteries or rechargeable batteries. Additionally, or alternatively, the power source 912 may include a power connector or power cord that connects the electronic device 900 to another power source, such as a wall outlet. Additionally, or alternatively, the power source 912 may include a battery in combination with a wireless charging interface.

The memory 904 may store electronic data that can be used by the electronic device 900. For example, the memory 904 may store electrical data or content such as, for example, audio and video files, documents and applications, device settings and user preferences, timing signals, control signals, instructions, and/or data structures or databases. The memory 904 may include any type of memory. By way of example only, the memory 904 may include random access memory, read-only memory, Flash memory, removable memory, other types of storage elements, or combinations of such memory types.

The electronic device 900 may also include one or more sensors 910 positioned almost anywhere on the electronic device 900. In some cases, the sensor(s) 910 may include one or more of the strain-sensing devices or strain sensors described with reference to FIG. 3. The sensor(s) 910 may be configured to sense one or more types of parameters, such as but not limited to, vibration; light; touch; force; heat; strain; movement; relative motion; biometric data (e.g., biological parameters) of a user; air quality; proximity; position; connectedness; surface quality; and so on. By way of example, the sensor(s) 910 may include a heat sensor, a position sensor, a light or optical sensor, an accelerometer, a pressure transducer, a gyroscope, a magnetometer, a health monitoring sensor, an air quality sensor, a strain sensor, and so on. Additionally, the one or more sensor systems 910 may utilize any suitable sensing technology, including, but not limited to, interferometric, magnetic, capacitive, ultrasonic, resistive, optical, acoustic, piezoelectric, or thermal technologies.

The I/O mechanism 908 may transmit or receive data from a user or another electronic device. The I/O mechanism 908 may include the display 906, a touch sensing input surface, a crown, one or more buttons (e.g., a graphical user interface "home" button), one or more cameras (including an under-display camera), one or more microphones or speakers, one or more ports such as a microphone port, and/or a keyboard. Additionally, or alternatively, the I/O mechanism 908 may transmit electronic signals via a communications interface, such as a wireless, wired, and/or optical communications interface. Examples of wireless and wired communications interfaces include, but are not limited to, cellular and Wi-Fi communications interfaces. In some embodiments, the I/O mechanism 908 may include aspects that are integrated with the sensor(s) 910 or the display 906.

The foregoing description, for purposes of explanation, uses specific nomenclature to provide a thorough understanding of the described embodiments. However, it will be apparent to one skilled in the art, after reading this description, that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art, after reading this description, that many modifications and variations are possible in view of the above teachings.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act ("HIPAA"); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of determining a metric, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, the output result may be provided based on non-personal information data or a bare minimum amount of personal information, such as events or states at the device associated with a user, other non-personal information, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A method, comprising:
monitoring an operating state of a button including an input member, a beam structure configured to be deflected as a result of a force input applied to the input member, a strain sensing system configured to generate an output signal based on deflection of the beam structure, and a switch configured to be actuated by movement of the input member, wherein:
  the output signal satisfying a threshold indicates a first operating state of the button; and actuation of the switch indicates a second operating state of the button;

detecting an instance of actuation of the switch;

determining, using the output signal, an actuation force corresponding to the instance of actuation of the switch;

determining an adjustment to the threshold using the determined actuation force.

2. The method of claim 1, comprising:

applying the determined adjustment to the threshold to change the threshold from a first value to a second value.

3. The method of claim 1, comprising determining user contact with a first contact location of the input member during actuation of the switch, wherein:

the threshold is a first threshold associated with the first contact location; and determining the adjustment to the threshold comprises determining a first adjustment to the first threshold.

4. The method of claim 3, comprising determining, based on the determined actuation force, a second adjustment to a second threshold associated with a second contact location of the input member.

5. The method of claim 1, wherein determining the actuation force of the switch comprises:

generating a set of output samples from the output signal;

removing one or more output samples from the set of output samples, to generate a subset of output samples; and determining the actuation force based on the subset of output samples.

6. The method of claim 5, wherein removing the one or more output samples from the set of output samples comprises:

performing a linear fit using the set of output samples; and removing the one or more output samples based on the linear fit.

7. The method of claim 1, wherein the switch is a dome switch and actuation of the switch corresponds to dome switch collapse.

8. The method of claim 1, wherein the first operating state of the button corresponds to a half button-press.

9. The method of claim 1, wherein when the button is in the first operating state a first operation of an electronic device is performed and when the button is in the second operating state a second operation of the electronic device, different from the first operation, is performed.

10. An input system of an electronic device, comprising:

an input member;

a beam structure configured to be deflected as a result of an input force applied to the input member;

a strain sensing system configured to generate an output signal based on deflection of the beam structure;

a switch configured to be actuated by movement of the input member;

processing circuitry configured to:

receive the output signal;

determine an operating state of the input system, wherein:

the output signal satisfying a threshold indicates a first operating state of the input system; and actuation of the switch indicates a second operating state of the input system;

detect an instance of actuation of the switch;

determine, using the output signal, an actuation force corresponding to the instance of the actuation of the switch; and determine an adjustment to the threshold using the determined actuation force.

11. The input system of claim 10, comprising a touch sensor associated with the input member and configured to generate a touch signal, and wherein the processing circuitry is configured to:

receive the touch signal; and determine, based on the received touch signal, a user contact with the input member at a first contact location of a set of contact locations; wherein:

determining the actuation force comprises determining a first actuation force corresponding to the first contact location.

12. The input system of claim 11, wherein:

determining the actuation force comprises determining a second actuation force corresponding to a second contact location of the set of contact locations.

13. The input system of claim 10, wherein determining the actuation force of the switch comprises:

generating a set of output samples from the output signal;

removing one or more output samples from the set of output samples, to generate a subset of output samples; and determining the actuation force based on the subset of output samples.

14. The input system of claim 13, wherein removing the one or more output samples from the set of output samples comprises:

performing a linear fit using the set of output samples; and removing the one or more output samples based on the linear fit.

15. The input system of claim 10, wherein the first operating state of the input system corresponds to a half button-press.

* * * * *